(12) United States Patent
Karrer

(10) Patent No.: US 6,322,128 B1
(45) Date of Patent: Nov. 27, 2001

(54) CARGO BED ATTACHMENT FOR TRUCKS

(76) Inventor: Robert Karrer, 3489 Fulton Ave., Smithers British Colombia V0J 2N0 (CA)

( * ) Notice: Subject to any disclaimer, the term of this patent is extended or adjusted under 35 U.S.C. 154(b) by 0 days.

(21) Appl. No.: 09/697,118

(22) Filed: Oct. 27, 2000

Related U.S. Application Data

(60) Provisional application No. 60/162,459, filed on Oct. 29, 1999.

(51) Int. Cl.$^7$ ........................................................ B60P 7/02
(52) U.S. Cl. .................. 296/100.06; 296/100.07; 296/37.6; 296/100.02; 224/404; 16/355
(58) Field of Search ............... 296/100.07, 100.06, 296/100.02, 37.6, 100.1; 229/404; 16/355

(56) References Cited

U.S. PATENT DOCUMENTS

| | | | |
|---|---|---|---|
| 3,640,423 | * 2/1972 | Paker et al. ........................ | 220/31 |
| 3,762,762 | * 10/1973 | Beveridge et al. ................. | 296/137 |
| 3,858,744 | * 1/1975 | Garvert ............................. | 296/100 |
| 3,923,334 | * 12/1975 | Key .................................. | 296/100 |
| 4,530,412 | * 7/1985 | Sigety ............................... | 16/260 |
| 4,832,394 | * 5/1989 | Macomber ........................ | 296/100 |
| 5,018,777 | * 5/1991 | Swenson et al. .................. | 296/100 |
| 5,058,946 | * 10/1991 | Faber ............................... | 296/100 |
| 5,118,156 | * 6/1992 | Richard ............................ | 296/40 |
| 5,322,336 | * 6/1994 | Isler ................................. | 296/100 |
| 5,421,633 | * 6/1995 | Moore et al. ..................... | 296/163 |
| 5,632,522 | * 5/1997 | Gaitan et al. ..................... | 296/100 |
| 5,685,593 | * 11/1997 | O'Connor ........................ | 296/100 |
| 5,787,522 | 8/1998 | Swihart ............................. | 5/45 |
| 5,909,921 | 6/1999 | Nesbeth ........................... | 296/100.1 |
| 5,961,173 | 10/1999 | Repetti ............................. | 296/100.07 |
| 6,076,881 | 6/2000 | Tucker ............................. | 296/100.07 |
| 6,082,806 | 7/2000 | Bogard ............................. | 296/100.07 |
| 6,129,407 | 10/2000 | Kooiker ........................... | 296/100.07 |
| 6,176,540 | 1/2001 | Whittaker ......................... | 296/100.07 |
| 6,183,035 | 2/2001 | Rusu et al. ....................... | 296/100.07 |
| 6,227,602 | 5/2001 | Bogard ............................. | 296/100.07 |

* cited by examiner

Primary Examiner—Stephen T. Gordon
Assistant Examiner—Kiran B. Patel
(74) Attorney, Agent, or Firm—Christopher R. Scott

(57) ABSTRACT

The present invention provides a hinge which can be used to attach a cover made up of individual parts to a cargo bed of a pick-up truck. The hinge provides adjustments to accommodate variations in the cargo bed so that the cover can be placed on the bed and the parts of the cover located relative to one another to allow the parts to be opened and closed independently. The hinge includes a mechanism which permits lengthwise movement relative to the truck as the cover part is raised angularly about the hinge so that the part does not interfere with adjacent parts as the part is raised or lowered. A cover made up of several parts for attachment to a cargo bed of a pick-up truck is also provided.

9 Claims, 4 Drawing Sheets

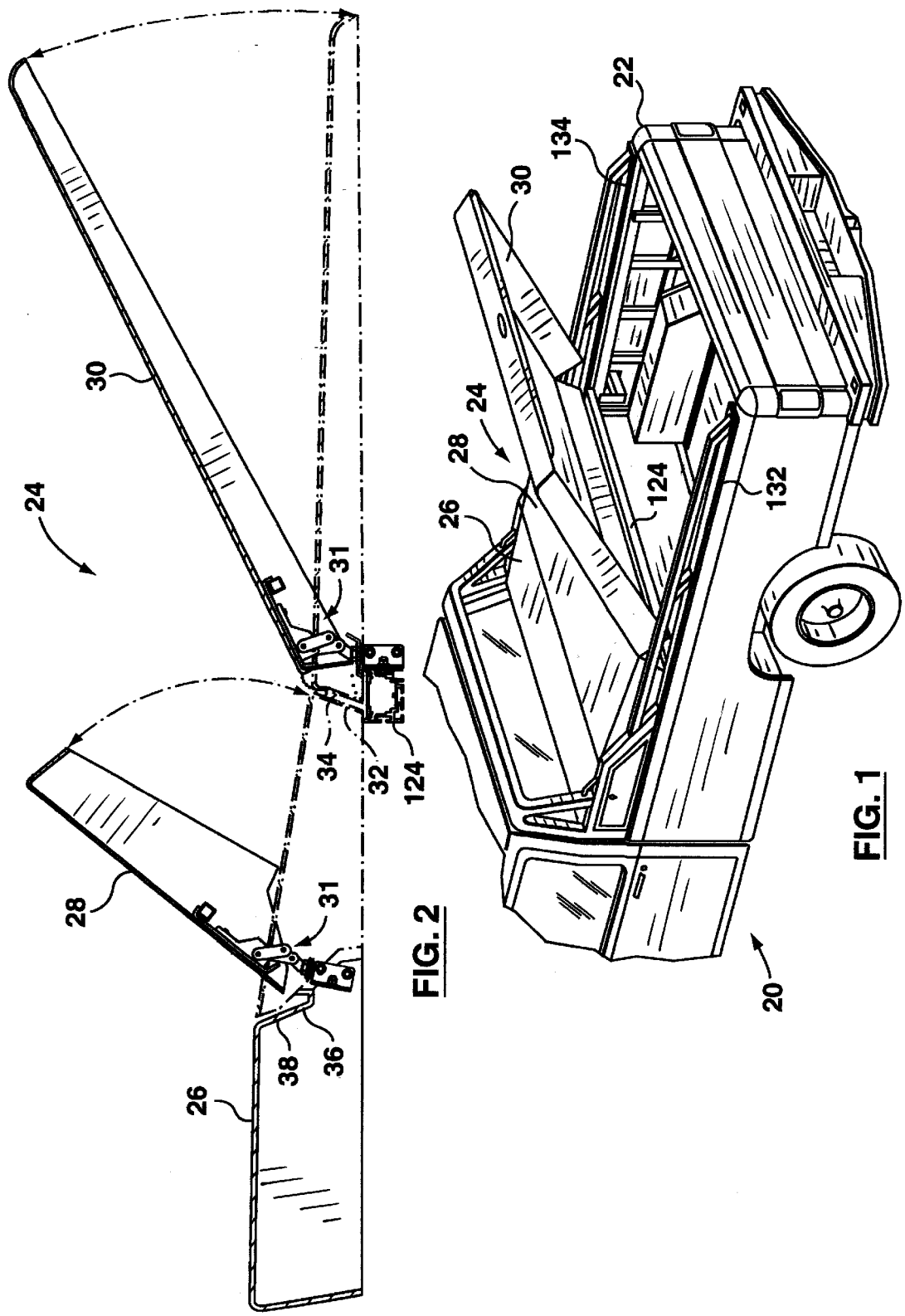

CARGO BED ATTACHMENT FOR TRUCKS

This application claims the benefit of prior filed provisional application serial No. 60/162,459 filed on Oct. 29, 1999.

FIELD OF THE INVENTION

This invention relates to trucks having a cargo bed and more particularly to a multi-part cover for the cargo bed, and a hinge for use in attaching the cover to the cargo bed.

BACKGROUND OF THE INVENTION

Users of pick-up trucks commonly add a cover to the cargo bed to provide secure storage and also, in some instances, to simply improve the appearance of the pick-up truck. Such covers include hard covers with structure to lock the cover to the cargo bed of the pick-up truck. Because of the size of the cargo bed it is advantageous if the hard cover can be made in sections such that each section can be opened and closed independently of the other sections. However such a cover must include structure to enable the installer to place the parts of the cover in relation to one another and also to place the complete cover in the preferred position on the cargo bed. The necessary adjustments should preferably be inherent in the assembly of the hinges to the cargo bed and to the parts of the cover.

SUMMARY OF THE INVENTION

In one of its aspects, the present invention provides a hinge which can be used to attach a cover made up of individual parts to a cargo bed of a pick-up truck. The hinge provides adjustments to accommodate variations in the cargo bed so that the cover can be placed on the bed and the parts of the cover located relative to one another to allow the parts to be opened and closed independently. The hinge includes a mechanism which permits lengthwise movement relative to the truck as the cover part is raised angularly about the hinge so that the part does not interfere with adjacent parts as the part is raised or lowered. A cover made up of several parts for attachment to a cargo bed of a pick-up truck is also provided.

BRIEF DESCRIPTION OF THE DRAWINGS

FIG. 1 is an isometric view of a pick-up truck looking from the side and to the rear of the truck to show a fitted cover for the cargo bed, the cover being attached by hinges according to a preferred embodiment of the invention to allow opening the three sections independently;

FIG. 2 is a side view of the cover and associated hinges to illustrate the movement of intermediate and rear parts of the cover as the parts are opened;

DESCRIPTION OF THE PREFERRED EMBODIMENT

Figure 3:
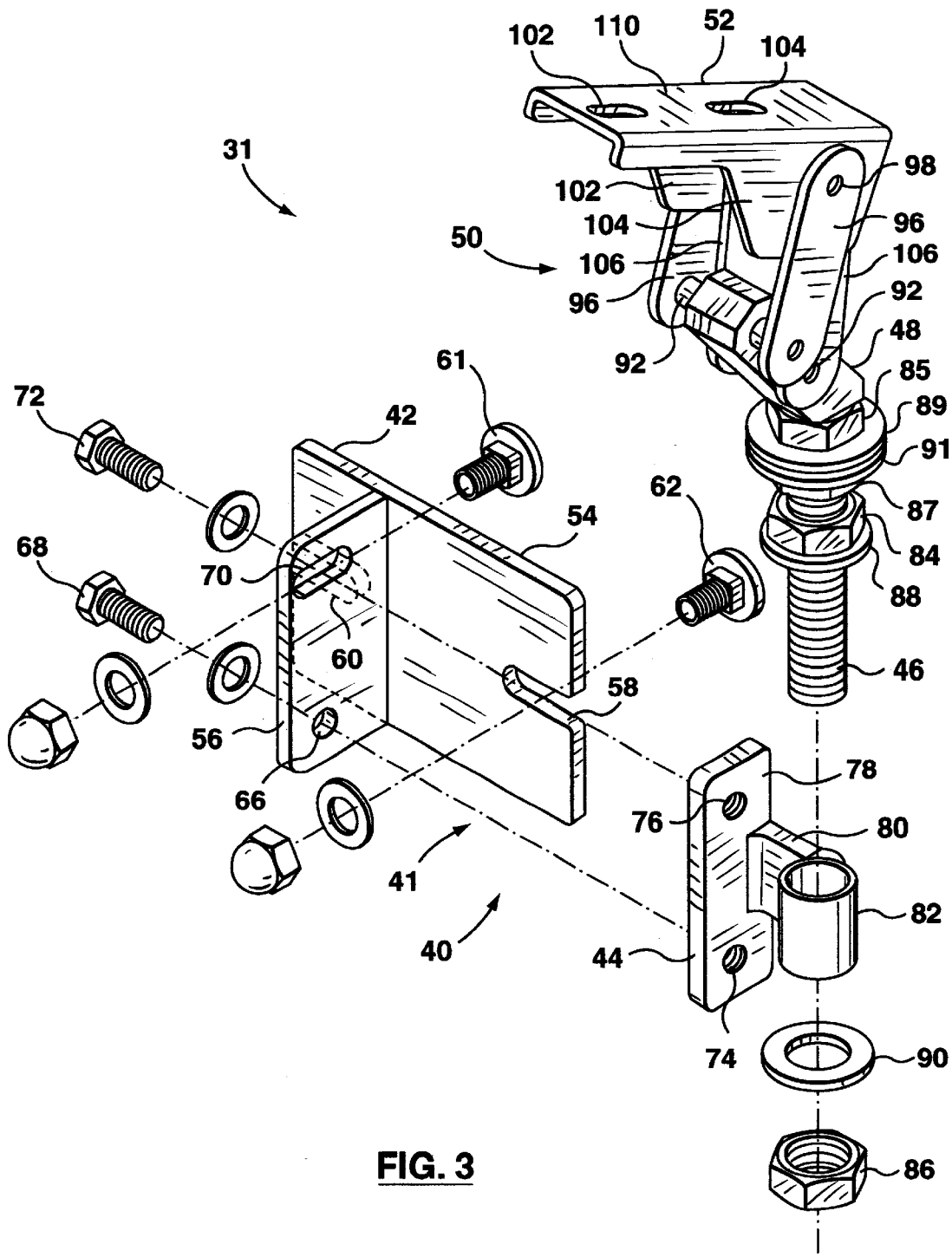
FIG. 3 is an exploded isometric view of one of the hinges.

Reference is first made to FIG. 1 to describe a preferred use of the invention on a pick-up truck designated generally by the numeral 20. The pick-up truck has a cargo bed 22 which can be closed by a cover assembly 23 having a three-part cover 24. The cover 24 has front, intermediate, and rear parts designated respectively as 26, 28, and 30 and each of the three parts can be raised about hinges according to the invention. The rear part is hinged upwardly to illustrate this movement. It will be clear from a general understanding of hinge movement that the hinges must not only allow upward movement but also move without interfering with the adjacent parts of the cover. This is achieved by a combination of hinge design and cover design and is illustrated in FIG. 2 from which it will be evident that hinges 31 are provided to accommodate movement of the parts both lengthwise of the truck and angularly. The lengthwise movement is accommodated by inclining the respective rear and front walls 32, 34 of the intermediate and rear parts 28, 30. As will be explained, when the parts are closed they come together to allow compression of a weather seal.

The intermediate part 28 combines with the front part 26 differently. In this case the front end of the intermediate part 28 has no wall but overhangs the hinge 31 to guide rainwater into a gutter 36 formed at the foot of a rear wall 38 of the front part 26. Although there are reasons why one or the other arrangement would be used, the requirements of the hinge are the same because for the hinge to allow the parts to open and close, the movement must be both lengthwise and pivotal.

Reference is next made to FIG. 3 which illustrates a preferred form of the hinge 31 according to the invention. A support designated generally by the numeral 40 includes a bracket assembly 41 having first and second brackets 42 and 44. The support 40 also includes a post 46 adapted to be mounted in the second bracket 44, and this bracket 44 is shaped to be attached to the first bracket 42 for attachment to the truck 20 (FIG. 1) as will be described.

The support 40 carries a fixed element 48 which is angled rearwardly (with respect to the truck) from the supporting post. A mechanism 50 is pivotally attached to the fixed element 48 and to an attachment piece 52 which is adapted to be attached to one of the parts of the cover. The mechanism 50 is arranged to provide a combination of angular and lengthwise movement as the hinge is operated to move the attachment piece 52 (and hence the associated one of the parts of the cover 24 shown in FIG. 1).

As seen in FIG. 3 the first bracket 42 has a main portion 54 and a projection 56 extending orthogonally from the main portion 54. Aligned slots 58, and 60 are provided in the main portion 54 to provide horizontal adjustment of the bracket once it is mounted using fasteners 62 and 64. The projection 56 includes a cylindrical bottom opening 66 shaped to receive a fastener 68 and a slot 70 above the opening 66 to receive a fastener 72. The fasteners 68 and 72 combine to hold the second bracket 44 in place by engagement through openings 74, 76 in a plate 78 of the second bracket 44. The arrangement is such that the slot 70 allows some angular motion between the brackets 42 and 44 to vary angular orientation of an extension 80 and attached sleeve 82 which is shaped to receive the post 46. As a result the post 46 can be moved angularly within limits to position the attachment piece as will be explained.

As mentioned previously, the post 46 is part of the support 40. The post is threaded to receive upper and lower location nuts 84 and 86 together with respective flat washers 88 and 90. As a result, the post can be locked to the sleeve after adjusting its height relative to the sleeve. This adjustment is used to vary the vertical spacing between the assembly of the first and second brackets 42 and 44 and the attachment piece 52.

A second pair of nuts 85 and 87 is associated with a pair of washers 89 and 91 for use to attach a weather strip or gutter as will be described.

As also seen in FIG. 3 the post 46 extends upwardly terminating where it is attached to the fixed element 48. This element is angled rearwardly (as mounted on a truck) and provides a compact assembly when the hinge is in a closed position (as will be described more fully with reference to FIG. 4). The fixed element 48 has upper and lower spindles 92 and 94 which are rotatably mounted in suitable openings, and the spindles extend in parallel and orthogonally with respect to the element 48. Two similar first links 96 are attached to the respective ends of the upper spindle 92 and extend in parallel from the spindle for movement in unison with the spindle 92. The links are attached at their upper ends (as drawn in FIG. 3) to a spindle 100 which is rotatably mounted in similar side flanges 102, 104 of the attachment piece 52.

Figure 4:
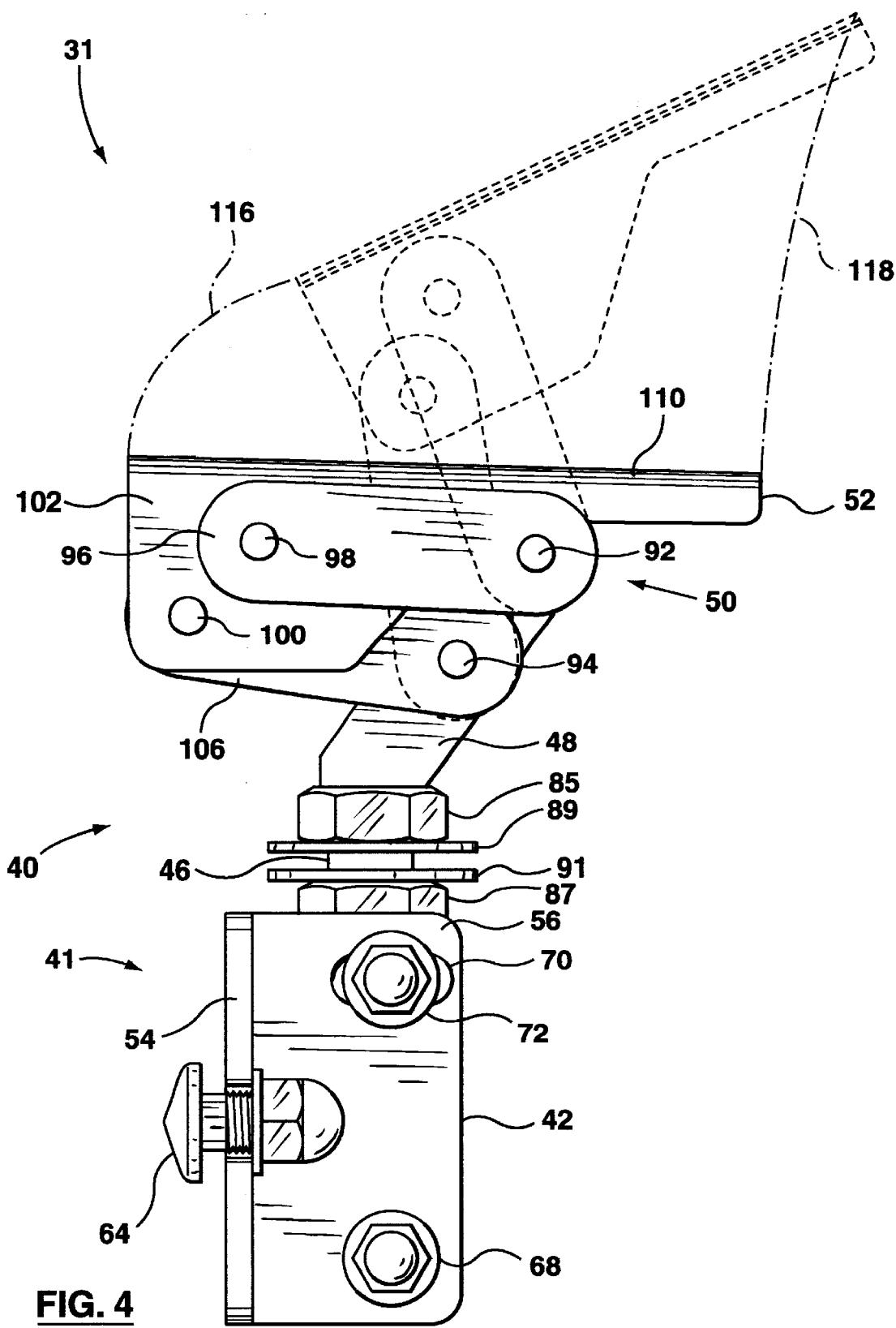
FIG. 4 is a side view of the hinge showing the hinge in a closed position in full outline, and in an open position in ghost outline.

The mechanism 50 also includes two similar second links 106 which are attached in similar fashion to the links 96 using lower spindle 94 and another spindle 108 which is seen in FIG. 4 but hidden in FIG. 3. The movement of the hinge 20 will be described with reference to FIG. 4.

The attachment piece 52 includes a central plate 110 between the side flanges 102 and 104 and defines a pair of slots running lengthwise of the truck when mounted on the truck. The slots in flanges 102, 104 allow adjustment of the associated part of the cover 24 (FIG. 1) to complement the other adjustments mentioned previously. Consequently hinges 20 can be positioned on the truck 20 and on the cover 24 to fit the parts of the cover relative to the truck and to one another.

Reference is next made to FIG. 4 which illustrates the movement of the hinge. The full outline shows the hinge 31 in a closed position in which the attachment piece 52 is generally horizontal, the position it would occupy when an associated part of the cover 24 (FIGS. 1 and 2) is closed. An open position is shown in ghost outline. When the part is opened the hinge accommodates the opening movement by rotating the links 96 and 106. The arrangement of the links is such that the piece 52 will tilt as it rotates. Also because the links start from a generally horizontal position, the piece 52 will carry the associated cover part lengthwise of the truck as the links become more vertical. This motion is indicated by the loci 116 and 118 which represent the motions of the respective ends of the attachment piece 52. It will be evident that such non-parallel motion of the piece 52 can be accomplished by selecting the spacing between the spindles 92 and 94 relative to the spacing between the spindles 98 and 100, and also by selecting the relative lengths of the links 96 and 106.

Figure 5:
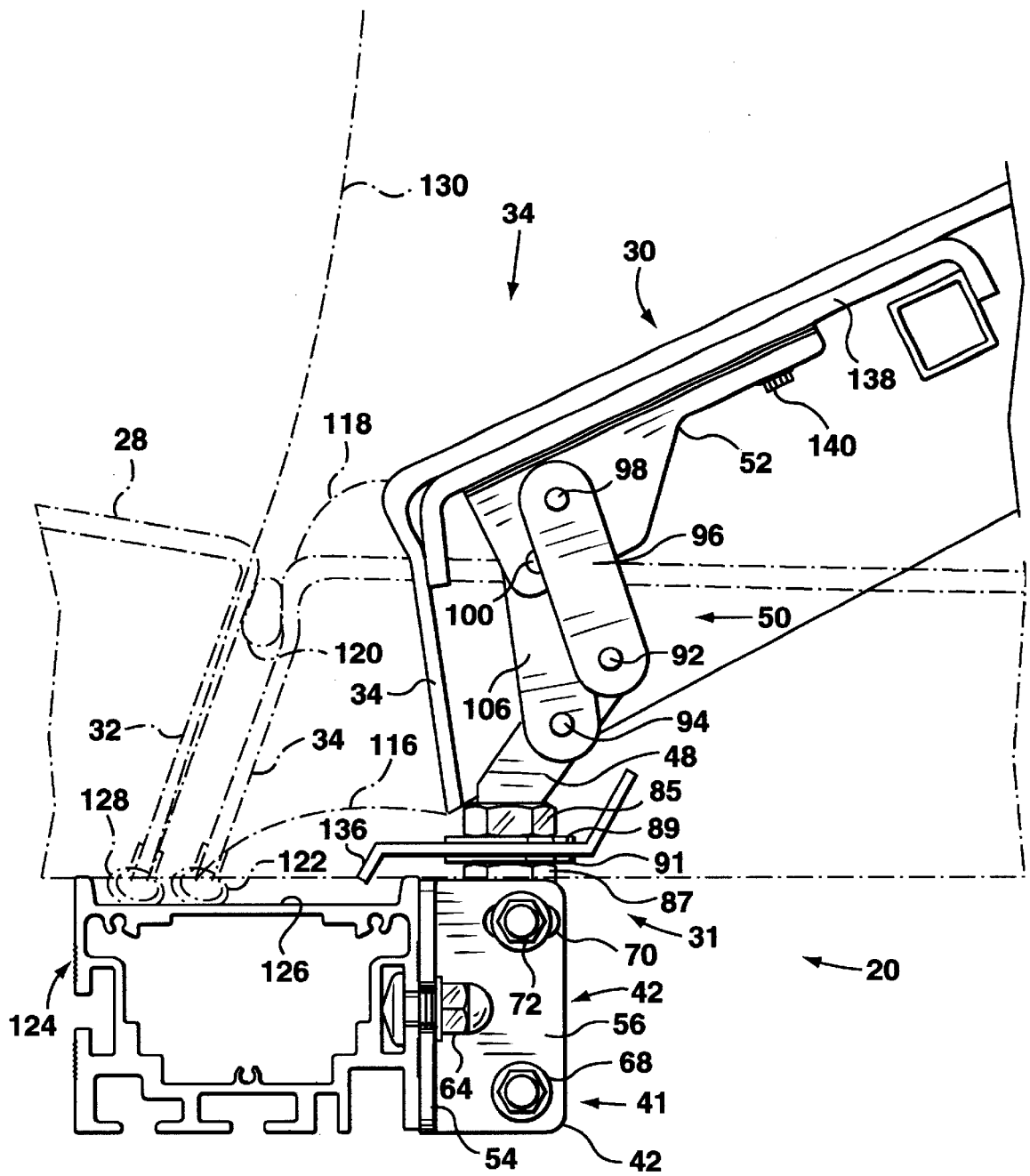
FIG. 5 is a view of the hinge in use with the cover on the pick-up truck.

Reference is next made to FIG. 5 which illustrates the hinge 31 assembled on the cover rear part 30, previously described with reference to FIG. 2. The rear part 30 is shown in the open position in full outline and in the closed position in ghost outline. It will be evident that when the part 30 is in the ghost outline closed position, the hinge is in a position corresponding to the full outline closed position shown in FIG. 4.

FIG. 5 also shows loci 116 and 118 of points at the bottom and top respectively of the front wall 34. These loci show that as the cover part 30 is raised, the wall 34 tilts and at the same time moves lengthwise of the truck away from the part 28. This avoids interference between the cover parts and also allows the use of upper and lower seals 120 and 122. Also, the rearwardly (with respect to the truck) angled fixed element 48 carries the mechanism 50 away from the locus 116 thereby providing clearance for the wall 34.

The upper seal 120 is simply attached to either of the parts 28 and 30 for compression between the parts when the cover 24 is closed. The lower seal 122 is generally U-shaped for attachment to the bottom edge of the wall 34 and proportioned to be compressed against a cross member 124 which forms part of a support structure attached to the truck for that purpose. The cross member 124 has a top trough 126 for guiding rainwater off the truck and the seal engages the trough. A similar seal 128 is provided on the wall 32 of the cover part 28 for the same purpose.

Although not shown in FIG. 5 hinges according to the invention are used to mount the cover intermediate part 28 in the position shown in FIG. 2. The motion of the part 28 when it is opened is indicated by a locus 130 which carries the lower end of the wall 32 forwardly of the truck to avoid engagement with the wall 34 of the cover part 30 and to release pressure on the seal 120. The action of the hinges on all of the cover parts is essentially the same with the hinges shaped to permit the required motions.

FIG. 5 also illustrates a typical attachment of the hinge 31 to the truck 20 and to the cover 24, in this case to the cover rear part 30. The hinges are used in pairs, one to either side of the truck, and attached to the cross member 124, which in turn is attached to side rails 132, 134 (FIG. 1) attached to the cargo bed of the truck. The fasteners 62 and 64 are used to make the attachment and adjusted in the slots 58, 60 (FIG. 1). As mentioned previously, the post 46 (FIG. 3) is aligned with respect to the vertical using fasteners 68 and 72 and the vertical positioning is done using the nuts 84 and 86 (also seen in FIG. 3).

In the exemplary arrangement shown in FIG. 5 the nuts 85 and 87 are used with the washers 89 and 91 to position a rainwater deflector 136 which guides water into the trough 126 to minimise the entry of water into the cargo bed of the truck.

The cover rear part 30 is attached to the attachment piece 52 and a reinforcing plate 138 is provided for the purpose. This plate includes tapped openings to receive screws 140 so that the fasteners will not show externally of the cover part 30.

It will be evident from the foregoing description that the hinge can be varied in shape to accommodate a variety of cover parts as required. This will result in varying the relative lengths of the links 96 and 106 and the positioning of the spindles 92, 94, 98 and 100. Also the support 40 can be varied to fit different truck cargo beds if necessary. These and other variations dictated by simple design criteria are within the scope of the invention as described and claimed.

What is claimed is:

1. A hinge for use in mounting a first part of a cover over a cargo bed of a pickup truck, the first part being adapted to be positioned with a second part of the cover on the cargo bed such that the first part is rearwardly of the second part and the first and second parts are adjacent and extending transversely of the cargo bed with respective front and rear walls adjacent, the hinge including:

a support having a bracket assembly for adjustable attachment to the pickup truck and a post coupled to the bracket assembly to extend upwardly from the bracket assembly on assembly, the post being adjustable relative to the bracket assembly to accomodate height variations relative to said cargo bed; and a hinge mechanism attached to the post and having an attachment piece for attachment to said first part, a fixed element coupled to the post, and links pivotably connecting the fixed element to the attachment piece for movement of the attachment piece from a closed position to support said first part in a closed position on the pickup truck cargo bed to cover the bed, and an open position in which the attachment piece has moved angularly and rearwardly with respect to the closed position to carry said first part into an open position to provide access into the cargo bed, the attachment piece thereby moving said forward wall rearwardly away from said rear wall as said first part moves from the closed to the open position.

2. A hinge as claimed in claim 1 in which the links include two pairs of links arranged to cause said angular and rearward motion.

3. A hinge as claimed in claim 1 in which the support permits limited adjustment on the pick-up truck both longitudinally and transversely of the pick-up truck.

4. A cover assembly for use in protecting a cargo bed of a pickup truck, the cover assembly including:

a cover having first and second parts including respective front and rear walls, the first and second parts being adapted to be positioned on the cargo bed such that the first part is rearwardly of the second part and said front and rear walls are adjacent and extending transversely of the cargo bed;

a pair of supports including a bracket assembly for adjustable attachment to the pickup truck and a post coupled to the bracket assembly to extend upwardly from the bracket assembly on assembly, the post being adjustable relative to the bracket assembly to accomodate height variations relative to said cargo bed; and a pair of hinge mechanisms attached one to each of said posts, each of the hinge mechanisms having an attachment piece for attachment to said first part, a fixed element coupled to a respective one of the posts, and links pivotably connecting the fixed element to the attachment piece for movement of the attachment piece from a closed position to support said first part in a closed position on the pickup truck cargo bed to cover the bed, and an open position in which the attachment piece has moved angularly and rearwardly with respect to the closed position to carry said first part into an open position to provide access into the cargo bed, the attachment piece thereby moving said forward wall rearwardly away from said rear wall as said first part moves from the closed to the open position.

5. A cover assembly as claimed in claim 4 in which said front and rear walls are arranged to incline upwardly and rearwardly when assembled on the pick-up truck.

6. A cover assembly as claimed in claim 4 and further comprising a pair of side rails adapted to be attached to the pick-up truck to either side of the cargo bed, and a cross member attachable to the side rails to cross the cargo bed.

7. A cover assembly as claimed in claim 6 in which the supports are adapted to be attached to the cross member.

8. A cover assembly as claimed in claim 6 in which said front and rear walls include seals engageable with the cross member when the hinges are in the closed position to deflect rainwater from the cargo bed.

9. A cover assembly as claimed in claim 6 and further comprising a seal coupled to the cover to seal a space between said front and rear walls when the hinges are in the closed position to deflect rainwater from the cargo bed.

\* \* \* \* \*